March 10, 1959 — E. A. MEYER — 2,877,164
SOLAR DISTILLATION DEVICE
Filed Sept. 7, 1955

INVENTOR.
EARL A. MEYER
BY
Attorney

United States Patent Office 2,877,164
Patented Mar. 10, 1959

2,877,164
SOLAR DISTILLATION DEVICE

Earl A. Meyer, Madison, Wis., assignor to Bjorksten Research Laboratories, Inc., Fitchburg, Wis., a corporation of Illinois Application September 7, 1955, Serial No. 532,839

3 Claims. (Cl. 202—185)

This invention relates to a water purifier and more particularly to a solar still which has the condensing area below the surface of the ground.

A solar still may consist basically of four elements: a closed chamber with a transparent wall on the side toward the sun, a tray for holding salt water, a condensing surface which is usually a part of the wall of the still, and a sweet water container below the condensing area. A prime object in designing solar stills has been to arrange or to build the condensing surface in such a way as to keep it as cool as possible, since the efficiency of a still is proportional to the temperature difference between the heated water and the condensing surface.

The most commonly used methods for attaining this aim have been to locate the condensing surface in such a way as to keep the amount of direct and reflected solar radiation falling on the condensing area to a minimum, to cool the surface by means of a wick from which water is evaporated, or to keep the surface cool by direct contact with flowing supply water.

The first method has the disadvantage that the temperature difference in the still is relatively small, since the condensing surface temperature is always above that of the surrounding air; the two other methods constitute a waste of the usually precious supply water.

It has been found by various tests that below the surface of the desert the temperature is only about 60° F., whereas at the surface it may be up to 150° F. An object of this invention is therefore to provide a solar still with increased efficiency by utilizing the high temperature difference between the surface and the subsurface soil or sand of the desert.

Other objects of the invention will become apparent from the drawings and following detailed description which are intended to illustrate the applicability of the invention without thereby limiting its scope to less than that of all those equivalents which will be apparent to one skilled in the art.

In the figures, like numerals refer to like parts and:

Figure 1:
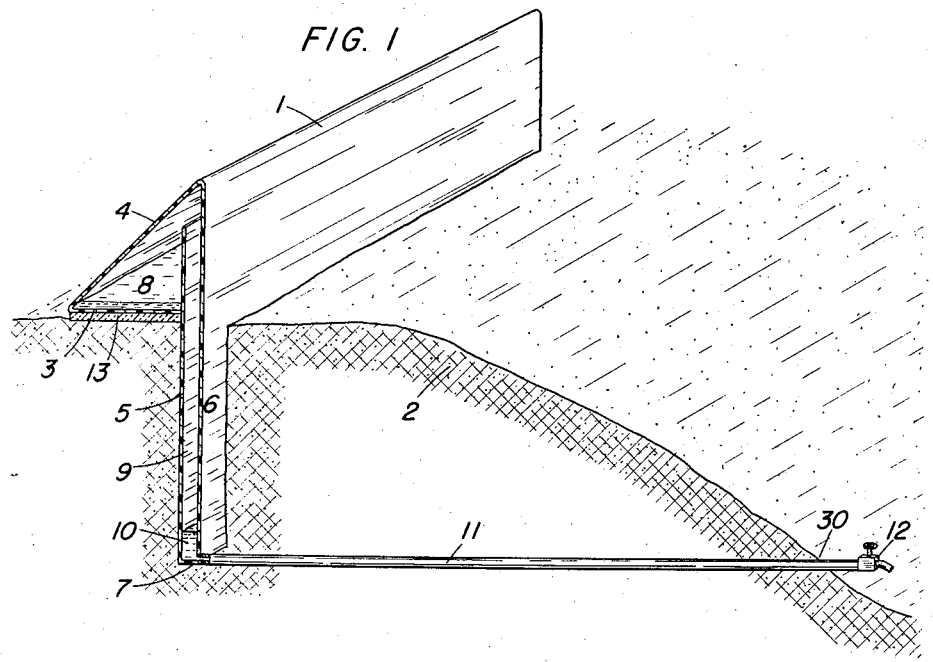
Figure 1 is a partly cross-sectional, partly perspective view of a solar still of this invention.

Referring now to Figure 1, there is shown a section of a solar still 1 of basically triangular shape, resting on sloped ground 2. Still 1 comprises a horizontal base section 3, a transparent wall 4 attached to and forming an acute angle with said base, two vertical sections 5 and 6 extending underground and attached to base 3 and sloped wall 4 respectively, and a horizontal strip 7 joining the lower edges of vertical sections 5 and 6. Base section 3, lower portion of sloped wall 4 and upper portion of vertical section 5 form a flat container adapted to hold salt water 8. Vertical sections 5 and 6 and the horizontal strip 7 form a deep and narrow channel 9 inside the ground 2. The upper and inner surfaces of said channel constitute the condensing area of the still, the lower portion of the channel serves as a container for distilled water 10.

A pipe 11 for removal of distilled water is connected to the lower portion of channel 9 and may extend horizontally therefrom. It may emerge from sloped ground 2 as at 30 and has a valve 12 attached to its end.

When the still is in operation, solar radiation penetrates transparent wall 4 and is absorbed by salt water 8 which is heated and evaporates. Insulation 13 below base section 3 reduces the heat loss from salt water 8 to the ground. The water vapor inside channel 9 will condense on the walls of said channel which are in direct contact with the relatively cool ground. Sweet water 10 collecting on the bottom of channel 9 can be removed through pipe 11 by opening valve 12. If the still is set up on generally level ground, the sweet water pipe 11 can be brought to an artificial pit if it is desired to remove the sweet water by gravity flow, or it can be pumped out.

Water vapor will continue flowing downward in channel 9 because of a difference in vapor pressures above the salt water and inside said channel resulting from the temperature difference between these two places.

Figure 2:
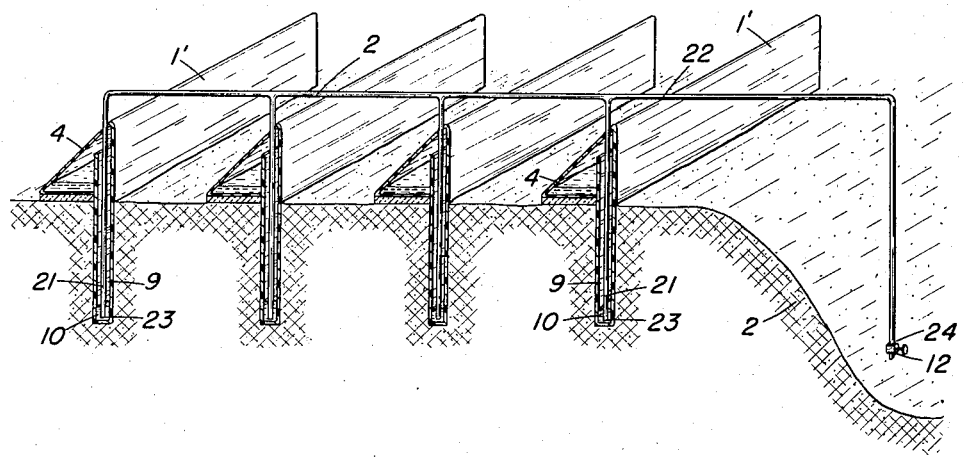
Figure 2 is a partly cross-sectional, partly perspective view of a bank of slightly modified solar stills of Figure 1.

Referring now to Figure 2, there is shown a group of solar stills in operating condition. These stills are similar to the embodiment of Figure 1 except that in this design the sweet water 10 is removed from channels 9 by vertical pipes 21 inside said channels. Pipes 21 extend through sloped walls 4 and join a main sweet water pipe 22 which can lead to a water pump, or can end at a point 24 lower than the ends 23 of vertical pipes 21 inside the stills. In the latter case, the sweet water on the bottom of channels 9 is easily removed by siphoning action. The arrangement of the distilled water pipes inside the stills and above the ground simplifies the installation of the stills and reduces their cost.

From the standpoint of manufacture, the still may be advantageously extruded in one piece. If it is desired to build the channel 9 and the horizontal base section 3 of a different material than the wall 4 which must be transparent, the channel and the base can be extruded in one piece and a transparent sheet can be attached to it.

As an alternative, both the channel and the triangular portion of the still can be made of sheet material of sufficient rigidity, which may be bent into the desired form.

The material of which transparent wall 4 is made may be any suitable transparent material such as a polyester, polyethylene, a polyacrylic or polymethacrylic ester, polyacrylonitrile, polyvinylidene chloride, cellulose acetate, cellulose acetate butyrate, polyethylene terephalate, polyvinyl chloride or copolymers of any of these. The polymeric material may be reinforced with fibrous glass or other fibers.

Channel 9 may be made of a metal or a synthetic resinous material. Metals are generally preferred because of superior thermal conductivity and high rigidity, stainless steel and aluminum being especially suitable. Plastics which may be used include fibrous glass reinforced polyester, melamine, phenolic and epoxy resins or polyethylene.

It is thus seen that the invention is broad in scope and is not restricted excepting by the claims in which it is my intention to cover all novelty inherent in this invention as broadly as possible in view of prior art.

Having thus disclosed my invention, I claim:

1. A solar still comprising: two parallel adjacent channel receptacles substantially separated by a partition thereinbetween; one of said receptacles being adapted to contain sea water and resting substantially on top of the ground and the other of said channel receptacles in heat exchange relation with the ground and having a portion of same adapted to serve as a condensing area for water vapor evaporated by virtue of solar radiation acting on sea water in said sea water receptacle; said channel receptacle in heat exchange relation with the ground further characterized by extending downwardly from said still below the surface of the ground and further characterized by extending downwardly from said still below the surface of the ground and further adapted to collect condensed fresh water.

2. A solar still comprising two parallel adjacent channel receptacles of substantially unlimited length substantially separated by a partition thereinbetween; one of said receptacles being adapted to contain sea water and resting substantially on top of the ground; the outer wall of said receptacle being transparent and extending upwardly and inwardly substantially over the device; the outer wall of the other receptacle extending directly downwardly from said still upwardly to join the first-mentioned receptacle wall and the other of said channel receptacle in heat exchange relation with the ground and having a portion of same adapted to serve as a condensing area for water vapor evaporated by virtue of solar radiation acting on sea water in said sea water receptacle; said channel receptacle in heat exchange relation with the ground further characterized by being substantially narrow and by extending downwardly from said still below the surface of the ground and further adapted to collect condensed fresh water; said channel connected below the surface of the ground to an underground conveying means joined to a discharge pipe.

3. A solar still comprising two parallel adjacent channel receptacles of substantially unlimited length separated by a partition thereinbetween; one of said receptacles being adapted to contain sea water and resting substantially on top of the ground; the outer wall of said receptacle being transparent and extending upwardly and inwardly substantially over the device; the outer wall of the other receptacle extending upwardly to join the first-mentioned receptacle wall and the other of said channel receptacles in heat exchange relation with the ground and having a portion of same adapted to serve as a condensing area for water vapor evaporated by virtue of solar radiation acting on sea water in said sea water receptacle; said channel receptacle in heat exchange relation with the ground further characterized by extending downwardly from said still below the surface of the ground and further adapted to collect condensed fresh water.

References Cited in the file of this patent

FOREIGN PATENTS 820,705    France _____ Aug. 9, 1937

OTHER REFERENCES

Demineralization of Saline Water with Solar Energy by G. O. G. Dept. of Interior, Aug. 1954, pages 17 and 25.

UNITED STATES PATENT OFFICE

CERTIFICATE OF CORRECTION

Patent No. 2,877,164                                        March 10, 1959

Earl A. Meyer

It is hereby certified that error appears in the printed specification of the above numbered patent requiring correction and that the said Letters Patent should read as corrected below.

Column 3, lines 17 and 18, strike out "directly downwardly from said still".

Signed and sealed this 22nd day of September 1959.

(SEAL)

Attest:

KARL H. AXLINE                                             ROBERT C. WATSON
Attesting Officer                                          Commissioner of Patents